United States Patent
Xie et al.

(10) Patent No.: US 11,902,049 B2
(45) Date of Patent: Feb. 13, 2024

(54) BIER PACKET SENDING METHOD AND APPARATUS

(71) Applicant: Huawei Technologies Co., Ltd., Shenzhen (CN)

(72) Inventors: Jingrong Xie, Beijing (CN); Yisong Liu, Shenzhen (CN); Shunwan Zhuang, Beijing (CN); Naiwen Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 17/468,196

(22) Filed: Sep. 7, 2021

(65) Prior Publication Data
US 2021/0409242 A1   Dec. 30, 2021

Related U.S. Application Data

(63) Continuation of application No. PCT/CN2020/078325, filed on Mar. 7, 2020.

(30) Foreign Application Priority Data

Mar. 8, 2019 (CN) .......................... 201910175395.1

(51) Int. Cl.
*H04L 12/46* (2006.01)
*H04L 45/02* (2022.01)
(Continued)

(52) U.S. Cl.
CPC .......... *H04L 12/4633* (2013.01); *H04L 45/04* (2013.01); *H04L 45/74* (2013.01); *H04L 45/50* (2013.01)

(58) Field of Classification Search
None
See application file for complete search history.

(56) References Cited

U.S. PATENT DOCUMENTS

| | | |
|---|---|---|
| 2013/0077624 A1 | 3/2013 | Keesara et al. |
| 2013/0308496 A1 | 11/2013 | Manur et al. |

(Continued)

FOREIGN PATENT DOCUMENTS

| | | |
|---|---|---|
| CN | 104283979 A | 1/2015 |
| CN | 104579954 A | 4/2015 |

(Continued)

OTHER PUBLICATIONS

Geng, L., et al, "MVPN using Segment Routing and BIER for High Reachability Multicast Deployment;" draft-geng-bier-sr-multicast-deployment-00, Jul. 2, 2018, 10 pages.

(Continued)

*Primary Examiner* — Christine T Duong
(74) *Attorney, Agent, or Firm* — Conley Rose, P.C.

(57) ABSTRACT

A bit index explicit replication (BIER) packet sending method includes receiving, by a first node in a first BIER domain, a packet from a second node in a second BIER domain, where the packet carries an identifier of the second BIER domain, determining a BIER packet sending policy corresponding to the identifier of the second BIER domain based on the identifier of the second BIER domain and according to a preconfigured BIER packet sending policy, and encapsulating and sending a BIER packet according to the BIER packet sending policy.

20 Claims, 7 Drawing Sheets

(51) Int. Cl.
  *H04L 45/74* (2022.01)
  *H04L 45/50* (2022.01)

(56) References Cited

U.S. PATENT DOCUMENTS

| | | | |
|---|---|---|---|
| 2016/0127306 A1 | 5/2016 | Wang et al. | |
| 2016/0277463 A1 | 9/2016 | Nagarajan et al. | |
| 2018/0063024 A1 | 3/2018 | Pfister et al. | |
| 2018/0083790 A1 | 3/2018 | Wijnands et al. | |
| 2018/0131532 A1 | 5/2018 | Wijnands et al. | |
| 2018/0167311 A1 | 6/2018 | Hasani et al. | |
| 2018/0205565 A1 | 7/2018 | Wijnands et al. | |
| 2018/0278470 A1 | 9/2018 | Wijnands et al. | |
| 2018/0278521 A1 | 9/2018 | Pfister et al. | |
| 2018/0278522 A1 | 9/2018 | Asati et al. | |
| 2018/0287935 A1 | 10/2018 | Wang et al. | |
| 2018/0367456 A1* | 12/2018 | Wijnands | H04L 12/1854 |
| 2019/0372877 A1* | 12/2019 | Nainar | H04L 45/16 |
| 2019/0394055 A1* | 12/2019 | Zhang | H04L 45/34 |
| 2020/0267011 A1 | 8/2020 | Peng et al. | |
| 2021/0029033 A1* | 1/2021 | Chen | H04L 45/302 |
| 2021/0058260 A1 | 2/2021 | Xia et al. | |

FOREIGN PATENT DOCUMENTS

| | | |
|---|---|---|
| CN | 105991302 A | 10/2016 |
| CN | 106572017 A | 4/2017 |
| CN | 107592262 A | 1/2018 |
| CN | 109150730 A | 1/2019 |
| CN | 109246017 A | 1/2019 |
| CN | 110460522 A | 11/2019 |
| CN | 110535768 A | 12/2019 |
| EP | 3361682 A1 | 8/2018 |
| WO | 2018228490 A1 | 12/2018 |

OTHER PUBLICATIONS

Rosen, E., RD., et al, "Multicast VPN Using BIER," draft-ietf-bier-mvpn-11, Mar. 19, 2018, 17 pages.

Previdi, S., Ed., et al, "Advertising Segment Routing Policies in BGP," draft-ietf-idr-segment-routing-te-policy-05, Nov. 20, 2018, 40 pages.

Rosen, E., Ed., et al, "The BGP Tunnel Encapsulation Attribute," draft-ietf-idr-tunnel-encaps-10, Obsoletes: 5512 (if approved), Aug. 20, 2018, 41 pages.

Filsils, C., "Segment Routing Policy Architecture," draft-ietf-spring-segment-routing-policy-01.txt, Jun. 11, 2018, 33 pages.

Voyer, D., Ed et al, "SR Replication Policy for P2MP Service Delivery," draft-voyer-spring-sr-p2mp-policy-01, Oct. 22, 2018, 9 pages.

Xie, J., et al, "Encapsulation for BIER in Non-MPLS IPv6 Networks," draft-xie-bier-6man encapsulation-02, Sep. 1, 2018, 11 pages.

Wijnands, IJ., et al, RFC8279, "Multicast Using Bit Index Explicit Replication (BIER)," Request for Comments: 8279, Category: Experimental, ISSN: 2070-1721, Nov. 2017, 43 pages.

Wijnands, IJ., et al, RFC 8296, "Encapsulation for Bit Index Explicit Replication (BIER) in MPLS and Non-MPLS Networks," Request for Comments: 8296, Category: Experimental, ISSN: 2070-1721, Jan. 2018, 24 pages.

\* cited by examiner

BIER PACKET SENDING METHOD AND APPARATUS

CROSS-REFERENCE TO RELATED APPLICATIONS

This application is a continuation of International Patent Application No. PCT/CN2020/078325 filed on Mar. 7, 2020, which claims priority to Chinese Patent Application No. 201910175395.1 filed on Mar. 8, 2019. The disclosures of the aforementioned applications are hereby incorporated by reference in their entireties.

TECHNICAL FIELD

This application relates to the field of network communication, and in particular, to a bit index explicit replication (BIER) packet sending method and apparatus.

BACKGROUND

An Internet Protocol (IP) multicast technology implements efficient point-to-multipoint data transmission on an IP network, thereby effectively saving network bandwidth and reducing network load. Therefore, the IP multicast technology is widely used in a plurality of aspects such as real-time data transmission, a multimedia conference, data copying, interactive personality television (IPTV), a game, and simulation. In the multicast technology, a multicast protocol needs to be used to construct a multicast tree on a control plane, and then the multicast tree is used to perform logical tree-like forwarding on a network plane, to implement multicast point-to-multipoint data forwarding of multicast forwarding. An intermediate node of a multicast routing protocol with a core of constructing a distribution tree needs to maintain a complex multicast forwarding information state. As a network scale becomes larger and multicast data traffic increases, the multicast technology faces increasingly high costs and operation and maintenance challenges.

Therefore, a new technology for constructing a multicast data forwarding path is put forward in the industry, and is referred to as a BIER technology. The technology proposes a new multicast technology architecture that does not need to construct a multicast distribution tree. A forwarding node that supports the BIER technology can forward a BIER packet in a BIER domain based on encapsulated BIER header information.

When a single router node sends the BIER packet to a node in another BIER domain, the router needs to encapsulate the BIER packet. The single router node is also considered as a single-node BIER domain. A BIER domain may be a network area that can flood bit location information of a node through an interior protocol and establish a bit index forwarding table (BIFT). Bit location information of nodes is not flooded between different BIER domains. When a leaf node receives a multicast join request, and a multicast source of the multicast join request is not in a local BIER domain, in the conventional technology, path information that a packet sent by the multicast source arrives at the local BIER domain needs to be configured for the leaf node, and the leaf node sends the path information to a head node.

However, different protocols correspond to different path information, for example, in Multiprotocol Label Switching (MPLS), path information is an MPLS label value. For another example, in IP version 6 (IPv6), path information is an address format of the IPv6. Therefore, in the conventional technology, the leaf node sends the configured path information to the head node. On one hand, signaling overheads are relatively high. On the other hand, different protocols correspond to different path information, and therefore more modifications are made to the protocol.

SUMMARY

This application provides a BIER packet sending method and apparatus. Because a leaf node does not need to send path information to a head node, signaling overheads are relatively low.

According to a first aspect, a BIER packet sending method is provided. The method includes the following.

A first node receives a packet sent by a second node in a second BIER domain, where the packet carries an identifier of the second BIER domain, and the first node is not in the second BIER domain, the first node determines a BIER packet sending policy corresponding to the identifier of the second BIER domain based on the identifier of the second BIER domain and according to a preconfigured BIER packet sending policy, and the first node encapsulates and sends a BIER packet according to the BIER packet sending policy.

It should be understood that the first node may be a routing and forwarding device in a first BIER domain, and the device has a function of encapsulating a BIER header and a peer-to-peer (P2P) tunnel into a packet, and sending an encapsulated packet. Alternatively, the first node may be a single device, and the single device has a function of encapsulating a BIER header and a P2P tunnel into a multicast packet, and sending an encapsulated packet.

In a possible implementation, the BIER packet sending policy includes path information. The first node encapsulates the path information corresponding to the identifier of the second BIER domain into the BIER packet. The first node sends the BIER packet to the second BIER domain based on the path information encapsulated into the BIER packet.

In the foregoing technical solutions, path information of a P2P tunnel corresponding to the identifier of the second BIER domain may be determined in local configuration information based on the identifier of the second BIER domain. A leaf node does not need to send the path information of the P2P tunnel to a head node, thereby reducing signaling overheads. In addition, because different protocols correspond to different segment identifier (SID) values of the P2P tunnel, and different SID types correspond to different protocol packet formats, the leaf node in this application does not need to send the SID of the P2P tunnel to the head node, and different segment identifiers (SIDs) corresponding to different protocols do not need to be defined at the leaf node. Therefore, fewer modifications are made to the existing protocol.

In another possible implementation, the BIER packet sending policy further includes an identifier of a BIFT (BIFT-ID). The first node encapsulates a BIER header of the BIER packet based on the BIFT-ID corresponding to the identifier of the second BIER domain. The first node sends the BIER packet to the second node in the second BIER domain based on the BIER header.

In another possible implementation, the path information includes an SID of segment routing (SR), an endpoint identifier of a User Datagram Protocol (UDP) tunnel, an SID of an IP, or an endpoint identifier IP of a Generic Routing Encapsulation (GRE) tunnel.

In another possible implementation, the identifier of the second BIER domain is a sub-domain (SD) identifier of the second BIER domain in which the second node is located.

In another possible implementation, the first node is a head node, and the second node is a leaf node.

According to a second aspect, a BIER packet sending apparatus is provided. The apparatus includes a receiving module configured to receive a packet sent by a second node in a second BIER domain, where the packet carries an identifier of the second BIER domain, and the first node is not in the second BIER domain, a determining module configured to determine a BIER packet sending policy corresponding to the identifier of the second BIER domain based on the identifier of the second BIER domain and according to a preconfigured BIER packet sending policy, and a sending module configured to encapsulate and send a BIER packet according to the BIER packet sending policy.

In a possible implementation, the BIER packet sending policy includes path information. The sending module is further configured to encapsulate path information corresponding to the identifier of the second BIER domain into the BIER packet, and send the BIER packet to the second BIER domain based on the path information encapsulated into the BIER packet.

In another possible implementation, the BIER packet sending policy further includes a BIFT-ID. The sending module is further configured to encapsulate a BIER header of the BIER packet based on a BIFT-ID corresponding to the identifier of the second BIER domain, and send the BIER packet to the second node in the second BIER domain based on the BIER header.

In another possible implementation, the path information includes an SID of SR, an endpoint identifier of a UDP tunnel, an SID of an IP, or an endpoint identifier IP of a GRE tunnel.

In another possible implementation, the identifier of the second BIER domain is an SD identifier of the second BIER domain in which the second node is located.

In another possible implementation, the first node is a head node, and the second node is a leaf node.

According to a third aspect, a BIER packet sending apparatus is provided, including an input/output interface, a processor, and a memory. The processor is configured to control the input/output interface to receive and send information, and the memory is configured to store a computer program. The processor is configured to invoke the computer program from the memory and run the computer program, so that the apparatus is enabled to perform the method in any one of the first aspect or the possible implementations of the first aspect.

Optionally, the processor may be a general-purpose processor, and may be implemented by using hardware or software. When implemented by using hardware, the processor may be a logic circuit, an integrated circuit, or the like. When the implemented by using software, the processor may be a general-purpose processor, and is implemented by reading software code stored in the memory. The memory may be integrated into the processor, may be located outside the processor, or may exist independently.

According to a fourth aspect, a computer program product is provided. The computer program product includes computer program code. When the computer program code is run on a computer, the computer is enabled to perform the methods in the foregoing aspects.

According to a fifth aspect, a computer-readable medium is provided. The computer-readable medium stores program code. When the computer program code is run on a computer, the computer is enabled to perform the methods in the foregoing aspects.

DESCRIPTION OF EMBODIMENTS

The following describes technical solutions of this application with reference to accompanying drawings.

An IP multicast technology implements efficient point-to-multipoint data transmission on an IP network, thereby effectively saving network bandwidth and reducing network load. Therefore, the IP multicast technology is widely used in a plurality of aspects such as real-time data transmission, a multimedia conference, data copying, IPTV, a game, and simulation. A multicast protocol of the multicast technology needs to construct a control plane multicast tree, and use the multicast tree to make a network plane be in a logical tree-like structure, to implement point-to-multipoint data forwarding of multicast forwarding. An intermediate node of a multicast routing protocol with a core of constructing a distribution tree needs to maintain a complex multicast forwarding information state. As a network scale becomes larger and multicast data traffic increases, the multicast technology faces increasingly high costs and operation and maintenance challenges.

Figure 1:
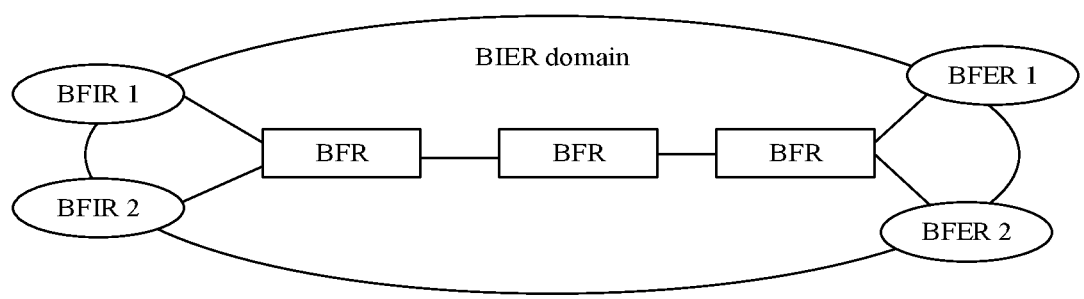
FIG. 1 is a schematic networking diagram of a BIER technology according to an embodiment of this application.

Therefore, a new technology for constructing a multicast data forwarding path is put forward in the industry, and is referred to as a BIER technology. The technology proposes a new multicast technology architecture that does not need to construct a multicast distribution tree. As shown in FIG. 1, a router that supports the BIER technology may be referred to as a BIER forwarding router (BFR), and the BFR device may receive and forward a BIER packet. A multicast forwarding domain including one or more BFRs is referred to as a BIER domain. At an edge of the BIER domain, a device that performs BIER data packet encapsulation on multicast data of a user is referred to as a bit forwarding ingress router (BFIR), and a device that decapsulates a BIER data packet is referred to as a bit forwarding egress router (BFER).

In the BIER domain, a globally unique bit position is configured for each edge node (for example, the BFER) in an entire BIER SD. For example, a value may be configured for each edge node as a BFR identifier (ID), for example, a value ranging from 1 to 256. All BFR-IDs in the BIER domain form a bit string. When multicast traffic (or a BIER multicast data packet) is transmitted in the BIER domain, a specific BIER header needs to be additionally encapsulated, and the BIER header marks all destination nodes of the multicast traffic in a form of the bit string. An intermediate forwarding node in the BIER domain performs routing based on the bit string carried in the BIER header, to ensure that the multicast traffic can be sent to all of the destination nodes.

Bit location information configured for a node is flooded in the BIER domain in advance by using a routing protocol, for example, an Open Shortest Path First (OSPF) protocol, an Intermediate System to Intermediate System (ISIS) protocol, a Border Gateway Protocol (BGP), or an Interior Gateway Protocol (IGP) in a layer 3 network, to form a BIFT used to guide each node in the BIER domain to forward the multicast traffic. When receiving the BIER packet encapsulated with the BIER header, the BFR forwards the BIER packet to the destination node according to the BIFT.

For ease of understanding, concepts related to the BIER header and the BIFT mentioned above are described in detail.

A format of the BIER header may include but is not limited to the bit string and a BIFT-ID.

(1) BIFT-ID:

Under MPLS encapsulation, the BIFT-ID may be a label. The label may include a combination of an SD/bit string length (BSL)/set identifier (SI). Different BIFT-IDs may correspond to different combinations of SD/BSL/SI.

The SD is an SD in the BIER domain, and different SDs may be configured in the BIER domain based on actual service scenario requirements. For example, different SDs may be configured in the BIER domain based on different services, for example, a virtual private network (VPN). For example, a VPN 1 uses an SD 0, and a VPN 2 uses an SD 1.

It should be noted that a plurality of VPNs may alternatively use a same SD. Different SDs in the BIER domain may be in a same IGP process or topology, or may not be in a same IGP process or topology. This is not limited in this embodiment of this application.

The BSL is a length of the bit string included in the BIER header. There may be a plurality of BSL types. This is not limited in this embodiment of this application. The BSL may be 64 bits, 128 bits, 256 bits, or the like.

The SI may be understood as a set including a plurality of nodes or configured BFR-IDs in a network. For example, when the BSL is 256 bits, but there are more than 256 nodes or 256 configured BFR-IDs in the network, the nodes or the BFR-IDs need to be divided into different sets. For example, nodes whose BFR-IDs are 1 to 256 form a set 0 (set 0, or SI=0), and nodes whose BFR-IDs are 257 to 512 form a set 1 (set 1, or SI=1).

After receiving the BIER multicast data packet, the BFR in the BIER domain may determine, based on the BIFT-ID in the BIER header, an SD to which the BIER multicast data packet belongs, a used BSL, and a set including nodes that forward the packet or configured BFR-IDs.

The following lists several possible combinations of SD/BSL/SI represented by BIFT-IDs:

BIFT-ID=91: corresponding to SD 0, BSL 256, SI 0;
BIFT-ID=92: corresponding to SD 0, BSL 256, SI 1;
BIFT-ID=93: corresponding to SD 0, BSL 256, SI 2;
BIFT-ID=94: corresponding to SD 0, BSL 256, SI 3;
BIFT-ID=95: corresponding to SD 0, BSL 512, SI 0; and
BIFT-ID=96: corresponding to SD 0, BSL 512, SI 1.

For example, when BIFT-ID=92, after receiving the BIER multicast data packet, the BFR may determine, based on the BIFT-ID in the BIER header, that the BIER multicast data packet belongs to the SD 0, the BSL used in the BIER header is 256 bits, and a set of nodes that forward the packet is the set 1 (which includes the nodes whose BFR-IDs are 257 to 512).

(2) Bit String:

Each bit in the bit string may be used to indicate a next-hop node that receives the BIER multicast data packet. When the BFR in the BIER domain receives the packet including the BIER header, the BFR forwards the BIER multicast data packet based on the bit string and the BIFT-ID that are carried in the BIER header.

For example, when the BIFT-ID in the BIER header received by the BFR is 92, the length of the bit string is 256 bits, and a node that forwards the BIER multicast data packet is one of the nodes whose BFR-IDs are 257 to 512. A least significant bit (rightmost bit) in the bit string is used to indicate that a next-hop node is a node whose BFR-ID is 257, and a second bit from right to left in the bit string is used to indicate that a next-hop node is a node whose BFR-ID is 258.

It should be understood that the BIER header has different encapsulation formats in different protocols.

The Ethernet protocol (Eth) is used as an example. A format of a BIER packet encapsulated under the Eth protocol is:

Eth header+BIER header+data.

An example of an MPLS protocol on an Ethernet link is used. A format of a BIER packet encapsulated under the MPLS protocol is:

Eth header+(optionally, another label)+BIER header+ data.

An IPv6 is used as an example. A format of a BIER packet encapsulated under the IPv6 protocol on an Ethernet link is:

Eth header+IPv6 basic header+IPv6 destination extension header (including a BIER header)+ data.

Figure 2:
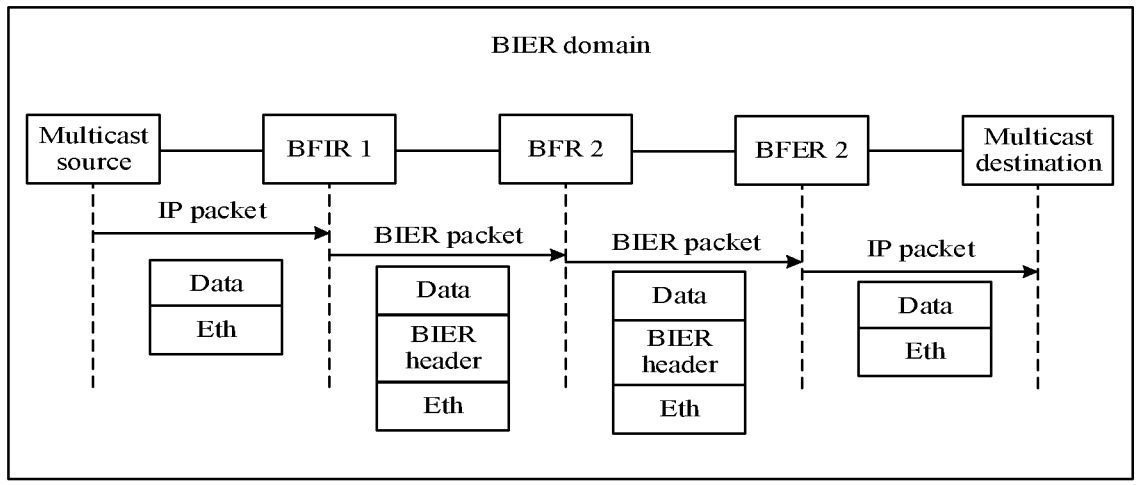
FIG. 2 is a schematic block diagram of sending a BIER multicast data packet based on a BIER header in a BIER domain according to an embodiment of this application.

With reference to FIG. 2, the following describes a specific implementation in which the intermediate forwarding node in the BIER domain sends the BIER multicast data packet based on the BIER header. For ease of description, in FIG. 2, a BIER packet encapsulated by using the MPLS protocol in the BIER domain (or a BIER-MPLS) is used as an example.

FIG. 2 is a schematic block diagram of sending a BIER multicast data packet based on a BIER header in a BIER domain according to an embodiment of this application. FIG. 2 may include a multicast source node, a multicast destination node, a BFR 1, a BFR 2, and a BFR 3.

It should be understood that one BIER domain may include a plurality of forwarding nodes BFRs. For ease of description, three BFRs are used as an example for description in FIG. 2.

As shown in FIG. 2, the BFR 1 is an ingress BFR, and the BFR 3 is an egress BFR. It is assumed that bit positions of the BFR 1, the BFR 2, and the BFR 3 are 0001, 0010, and 0100 respectively. The egress BFR 3 notifies the bit position of the BFR 3 in the BIER domain by using an interior protocol. After receiving a notification of the bit position of the egress BFR 3, the ingress BFR 1 stores the bit position of the BFR 3 in a local bit index forwarding table. For a specific description of the interior protocol, refer to the foregoing description. Details are not described herein again.

(1) Multicast Source Node:

When a user in a network requires specific data, the multicast source node may serve as a server to send a required multicast packet to the user.

Further, the multicast source node may send an IP packet to the next-hop BFR 1. The IP packet may include two parts: an Eth header and data.

(2) BFIR 1:

BFIR 1 is a head node and has a capability of BIER encapsulation. When the ingress BFIR 1 receives the multicast packet sent by the multicast source node, it is assumed that the multicast packet needs to be sent to the egress BFER 2. The BFR 1 calculates that a value of a bit string of the packet is 0010 based on a mapping relationship in the BIFT pre-stored locally, and encapsulates the multicast packet of the user into a BIER multicast data packet. A bit string in a BIER header of the BIER multicast data packet is filled with 0010, and the BIER multicast data packet is forwarded to the BFR 2.

(3) BFR 2:

After receiving the BIER multicast data packet, the intermediate forwarding node BFR 2 searches for the BIFT pre-stored locally, and determines to fill the bit string in the BIER header of the BIER multicast data packet sent to the BFR 3 with 0100.

(4) BFER 2:

The BFER 2 is a leaf node and has a capability of BIER decapsulation. After receiving the BIER multicast data packet from the BFR 2, the egress BFER 2 determines that the egress BFER 2 is a destination node of the BIER multicast data packet based on the bit string 0100 in the BIER header and a BFR-ID 3 of the egress BFER 2, decapsulates the BIER multicast data packet, and sends the IP packet to the multicast destination node.

FIG. 2 describes a process in which one or more forwarding devices send a BIER multicast data packet based on a header of a BIER packet in a BIER domain. The following describes a process in which a BIER multicast data packet is sent between different BIER domains by using the BIER technology.

A BIER domain may be understood as a network area that can flood bit location information of a node through an interior protocol and establish a BIFT. Bit location information of a node is not flooded between different BIER domains. For example, the interior protocol is deployed in an autonomous system (AS) domain, and bit location information of a node is flooded. The AS domain may be a BIER domain. For another example, in a network with a plurality of AS domains, interior protocol may be deployed in different AS domains, and bit location information of a node is flooded. However, the interior protocol deployed between the AS domains does not flood bit location information of a node. In this case, the plurality of AS domains may be understood as different BIER domains.

Figure 3:
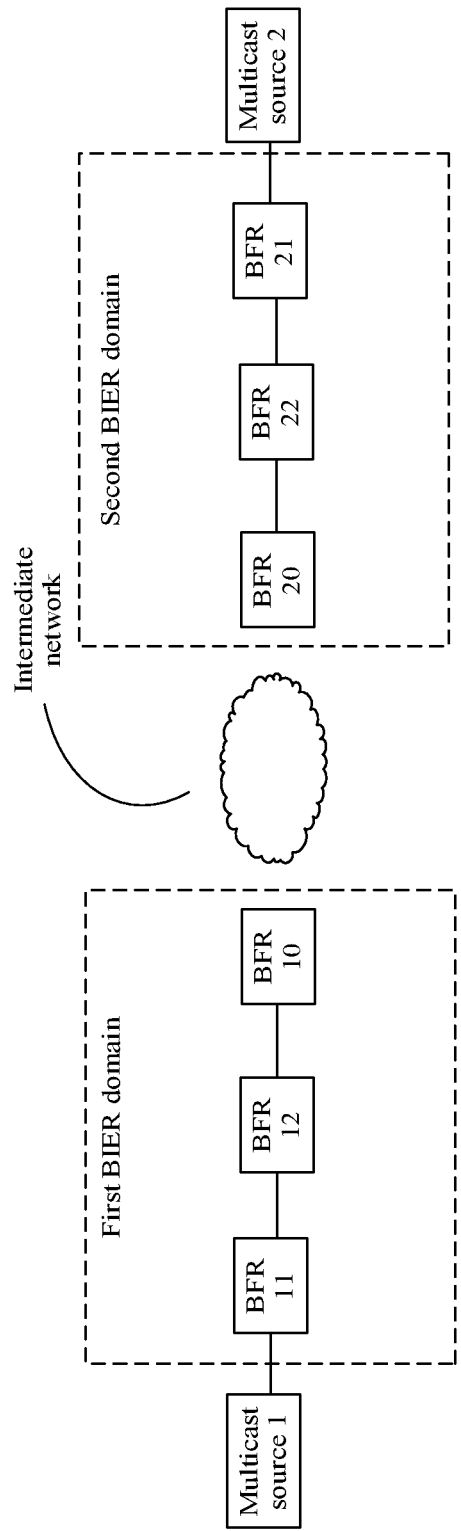
FIG. 3 is a schematic block diagram of sending a BIER multicast data packet across BIER domains applied to an embodiment of this application.

FIG. 3 is a schematic block diagram of sending a BIER multicast data packet across BIER domains applied to an embodiment of this application. In FIG. 2, a plurality of BIER domains may be included. For ease of description, a first BIER domain and a second BIER domain are used as an example for description.

As shown in FIG. 3, the first BIER domain includes a BFR 10, a BFR 11, and a BFR 12. The second BIER domain includes a BFR 20, a BFR 21, and a BFR 22. The BFR 11 and the BFR 21 are provider edge (PE) routers.

It should be noted that, in this embodiment of this application, a head node across the second BIER domain and an intermediate network may be a router in the first BIER domain, or may be a single device. The device, as a head node, has a function of encapsulating a BIER header into the multicast packet, encapsulating a P2P tunnel, and sending the packet.

Referring to FIG. 3, in this embodiment of this application, the head node needs to send the BIER packet to the second BIER domain through the P2P tunnel, and then perform replication and forwarding in the second BIER domain based on the BIER header. For example, the P2P tunnel may be established between the head node and a BFR node close to the intermediate network in the second BIER domain, or the P2P tunnel may be established between the head node and another node in the second BIER domain. A node serving as a P2P tunnel endpoint in the second BIER domain is an anchor point, and is configured to start BIER replication and forwarding after sending a P2P unicast packet across BIER domains to the anchor point.

For example, when the BFR 21 in the second BIER domain receives a user multicast join request sent by a user, and a multicast source of the user multicast join request is a multicast source 1, because the BFR 21 and the multicast source 1 belong to different BIER domains, the BIER packet needs to be sent from the head node to the second BIER domain through the P2P tunnel, and then replication and forwarding are performed in the second BIER domain based on the BIER header. For example, the P2P tunnel may be established between the head node and a BFR node close to the intermediate network in the second BIER domain, or the P2P tunnel may be established between the head node and another node in the second BIER domain. A node serving as a P2P tunnel endpoint in the second BIER domain is an anchor point, and is configured to start BIER replication and forwarding after sending a P2P unicast packet across BIER domains to the anchor point. BFR 10, as the head node, may send the BIER packet to the second BIER domain through the P2P tunnel, and then perform replication and forwarding in the second BIER domain based on the BIER header. For example, the P2P tunnel may be established between the head node, BFR 10 and a BFR node close to the intermediate network in the second BIER domain. For another example, the P2P tunnel may further be established between the head node, BFR 10 and another node in the second BIER domain.

It should be understood that, a node serving as a P2P tunnel endpoint in the second BIER domain is an anchor point, and is configured to start replication and forwarding on the BIER packet after sending a P2P unicast packet across BIER domains to the node.

To enable the BFR 10 in the first BIER domain to send the BIER multicast data packet to the BFR 20 in the second BIER domain through the P2P tunnel, in the conventional technology, after receiving the multicast join request sent by the user, the BFR 21 may add encapsulation information of the P2P tunnel in the second BIER domain to a multicast join message sent to the BFR 11, for example, an SID of the BFR 20 in the second BIER domain.

Further, the SID of the BFR 20 may be configured for the BFR 21 in the second BIER domain. The BFR 21 may send the SID of the BFR 20 to the BFR 11 by using BGP-multicast VPN (BGP-MVPN) signaling. SR divides the P2P tunnel between the BFR 10 and the BFR 20 through which a packet flow passes into a plurality of segments, and the plurality of segments are identified by SIDs. The SR adds the SIDs of the plurality of segments divided on the P2P tunnel to encapsulation information of the tunnel in an outer layer of the BIER header, so that the plurality of segments on the P2P tunnel between the BFR 10 and the BFR 20 may send the BIER multicast data packet from the BFR 10 in the first BIER domain to the BFR 20 in the second BIER domain hop by hop based on SID information of the BFR 20 encapsulated outside the BIER multicast data packet.

However, different protocols correspond to different SID values, for example, in the MPLS, a SID value corresponding to the SR is an MPLS label value. For another example, in the IPv6, an SID value corresponding to the SR is an address format of the IPv6. Different SID types correspond to different protocol packet formats. Therefore, different provider multicast service interface tunnel attributes (PTA) need to be defined for different SID types of the BFR 20 on the BFR 21. On the one hand, defining different tunnel attributes PTA makes more modifications to the existing protocol. On the other hand, the SID of the BFR 20 needs to be configured for the BFR 21 in the second BIER domain, and the BFR 21 further needs to send the configured SID of the BFR 20 to the BFR 11, causing relatively high signaling overheads.

In the technical solutions provided in this embodiment of this application, the BFR 21 does not need to send the SID of the BFR 20 to the BFR 11, and does not need to use different PTA tunnel types according to different protocols, thereby making fewer modifications to the protocol and reducing signaling overheads.

It should be noted that this embodiment of this application is applicable to a plurality of protocols. For example, the BIER domain may use a BIER packet encapsulated by the MPLS protocol. In this case, the P2P tunnel described in FIG. 2 may be an SR-MPLS tunnel, or may be a UDP tunnel. P2P tunnel information is first encapsulated before the BIER header is encapsulated. For another example, the BIER domain may use a BIER packet encapsulated by the Eth protocol. In this case, the P2P tunnel described in FIG. 2 may be a UDP tunnel. UDP tunnel information is encapsulated before the BIER header. For another example, the BIER domain may use a BIER packet encapsulated by the IPv6 protocol. In this case, the P2P tunnel described in FIG. 2 may be an SRv6 tunnel. SRv6 tunnel information is encapsulated before the BIER header. The SRv6 tunnel may carry an SR header (SRH), or may not carry an SRH header. In a case that the tunnel carries an SRH header, the SRv6 tunnel is an IPv6 tunnel with an explicit specified tunnel path. In a case that the tunnel does not carry an SRH header, the SRv6 tunnel is an IPv6 tunnel with a non-explicit specified tunnel path. For example, a destination address of an IPv6 header is: unicast+IPv6 extension header carrying the BIER header+inner IP header+multicast data packet. A unicast source address and a unicast destination address of the IPv6 header represent an IPv6 tunnel, and the BIER header is processed after the BIER header arrives at an end of the IPv6 tunnel.

The SRv6 tunnel may be understood as SR using the IPv6 protocol, and the SR-MPLS tunnel may be understood as SR using the MPLS protocol.

In this embodiment of this application, the node in the first BIER domain and the node in the second BIER domain need to be configured. Configuration information may include but is not limited to an identifier of a BIER domain, a VPN sending configuration table, and a packet sending policy. The following describes the foregoing several types of configuration information in detail by using the first BIER domain as an example.

(1) Configure the Identifier of the BIER Domain:

In this embodiment of this application, the identifier of the BIER domain may be configured for the first BIER domain. A configuration granularity is not limited in this embodiment of this application. For example, an identifier may be configured for the first BIER domain, and all SDs in the first BIER domain use the identifier. For another example, an identifier may be configured for each SD in the first BIER domain.

For example, an identifier of the first BIER domain is a color 1, an identifier of the second BIER domain is a color 2, and the configuration granularity is that an identifier is configured for each SD in the first BIER domain. Specific configuration signaling of the identifier of the BIER domain is as follows:

```
bier 1
SD 0
  bfr-prefix
    bfr-id
    protocol xxx //xxx, for example, may be an ISIS protocol, an OSPF protocol, or the BGP
    encapsulation-type xxx //xxx, for example, may be the MPLS protocol, the Eth protocol, or the IPv6 protocol
    color 1 //configure an identifier of a domain for SD 0 of bier 1.
```

(2) VPN Sending Configuration Table:

The table is used to configure an SD in the first BIER domain that is used by a VPN and a packet sending policy used by the VPN.

Specific signaling of the VPN sending configuration table is as follows:

```
mvpn
  bier 1 SD 0 replication-policy xxx.
```

(3) Configure the Packet Sending Policy (or a Replication Policy).

The configured packet sending policy may include but is not limited to path information and encapsulation information. The path information is a correspondence between an identifier (for example, a color) of each BIER domain and a path used to transmit a packet to a BIER domain corresponding to a color. The encapsulation information includes information about encapsulating the BIER header, for example, a bit string and a BIFT-ID that are required for encapsulating the BIER header.

Specific configuration signaling is as follows:

```
<color=1>
  use bsl 256 //specify a BSL used to encapsulate the BIER when the packet is sent
  path=NULL
<color=2>
```

-continued

```
    use bsl 256 //specify a BSL used to encapsulate the BIER header when the packet
is sent
      BIFT-id<SD_BSL>=X //specify a BIFT-ID value required for encapsulating the
BIER header when the packet is sent, where the BIFT-ID value is configured based on a tunnel
endpoint to which the path points
    path=SID_list<SID1,SID2,R20> //specify a path when the packet is sent.
```

In the foregoing signaling, "<color=1>path=NULL" is used to indicate that the BIER multicast data packet is transmitted between nodes in the first BIER domain based on the encapsulated BIER header. "use bsl" is used to determine a length of a bit string used when a plurality of BFR-IDs of the BIER domain represented by <color=2> are encapsulated into a bit string of the BIER header. "path=NULL" is used to determine that the head node and the leaf node receiving a multicast join request are in a same BIER domain. In this case, it is determined that the head node does not need to pass through the P2P tunnel, and the head node forwards the packet according to a BIFT stored locally, for example, the bit string may be used to determine an egress interface and a BFR-ID of a next hop.

In the foregoing signaling, "<color=2>path=SID_list<SID1,SID2,R20>" is used to indicate that the node in the first BIER domain transmits the BIER multicast data packet to the node in the second BIER domain. "use bsl" is used to determine a length of a bit string used when a plurality of BFR-IDs of the BIER domain represented by <color=2> are encapsulated into a bit string of the BIER header. "BIFT-id<SD_BSL>=X" is used to determine a BIFT-ID field encapsulated into the BIER header. The field is determined by a specific triplet, SD/BSL/SI. In BIER-MPLS encapsulation, the BIFT-ID value is an MPLS label. "path=SID_list<SID1,SID2,R20>" is used to determine encapsulation information of the P2P tunnel except for the BIER header. If the P2P tunnel is an SR-MPLS tunnel or an SRv6 tunnel, encapsulation information of the P2P tunnel is a SID list. SID1, SID2, and R 20 are used to indicate segment identifiers (SIDs) of a plurality of segments on a P2P tunnel between the first BIER domain and the second BIER domain.

It should be understood that for a same SD and a same BSL, BIFT-IDs of different SIs are consecutive. For example, if SD=0, 1, and 2, corresponding BIFT-ID values are respectively 101, 102, and 103.

It should be further understood that a BIFT-ID may be dynamically allocated, or may be statically and directly obtained and configured. This is not limited in this embodiment of this application.

Optionally, in some embodiments, an encapsulation format of the P2P tunnel in the replication policy matches a protocol used to encapsulate the BIER multicast data packet in the SD 0, so that the conventional technology may support overlay encapsulation of the BIER packet and the P2P tunnel, thereby reducing modifications made to the existing protocol. For example, if an encapsulation format of the BIER packet is a BIER-MPLS, the encapsulation format of the P2P tunnel may be an SR-MPLS, a UDP, or a GRE protocol. For another example, if an encapsulation format of the BIER packet is a BIER-IPv6, the encapsulation format of the P2P tunnel may be an SRv6, or an IPv6.

Optionally, in some embodiments, the configuration information may further include a tracking table, and the table is used to track each leaf node in the BIER domain. In addition, the table may aggregate leaf nodes based on a color that each leaf node carries and is used to indicate a BIER domain in which the leaf node is located, and determine a leaf node that a specific color has. This can avoid a case in the conventional technology in which, after a color that is carried by each leaf node and that is of a BIER domain in which the leaf node is located is received, leaf nodes that carry the same color need to be extracted one by one, thereby reducing signaling overheads.

In this embodiment of this application, the head node and the leaf node in the second BIER domain may be separately configured according to the foregoing configuration method. For ease of description, in this embodiment of this application, a color identifier is used to identify the identifier of the first BIER domain and the identifier of the second BIER domain. For example, a color 1 is used to indicate an identifier of an SD 0 in the first BIER domain, and a color 2 is used to indicate an identifier of an SD 0 in the second BIER domain.

It should be noted that the head node may be in the first BIER domain, or may be an independent node. This is not limited in this embodiment of this application. For ease of description, the following provides description by using an example in which the head node is in the first BIER domain.

A node (for example, the BFR 11 or the BFR 12) in the first BIER domain is configured according to the following:

```
bier 1
  SD 0
    bfr-prefix
    bfr-id
      protocol xxx //xxx, for example, may be the ISIS protocol, the OSPF protocol, or
the BGP
      encapsulation-type xxx //xxx, for example, may be the MPLS protocol, the Eth
protocol, or the IPv6 protocol
      color 1 //configure an identifier of the BIER domain for the SD 0 of bier 1
  ip vpn vpn1
    ipv4-family
    mvpn
        bier 1 SD 0 rep-policy xxx//xxx may be a configured packet sending policy
      multicast rep-policy (mpls/ipv6) xxx
      <color=1>
```

```
    use bsl 256 //specify a BSL used to encapsulate the BIER when the packet is sent
path=NULL
<color=2>
    use bsl 256 //specify a BSL used to encapsulate the BIER when the packet is sent
    BIFT-id<SD_BSL>=X //specify a BIFT-ID value required for encapsulating the
BIER header when the packet is sent, where the BIFT-ID value is configured based on a
tunnel endpoint to which the path points
    path=SID_list<SID1,SID2,R20> //specify a path when the packet is sent.
```

It should be noted that, in this embodiment of this application, when the packet is sent, the path may be a path of an SR or SRv6 tunnel, or may be a path of an IP, a UDP, or a GRE tunnel.

A node (for example, the PE 21 or the PE 22) in the second BIER domain is configured according to the following:

```
bier 2
  SD 0
  bfr-prefix
    bfr-id
    protocol xxx //xxx, for example, may be the ISIS protocol, the OSPF protocol, or
the BGP
    encapsulation-type xxx //xxx, for example, may be the MPLS protocol, the Eth
protocol, or the IPv6 protocol
    color 2 //configure an identifier of the BIER domain for the SD 0 of bier 2
  ip vpn vpn1
  ipv4-family
  mvpn
    bier 2 SD 0 rep-policy xxx//xxx may be a configured packet sending policy
  multicast rep-policy (mpls/ipv6) xxx
  <color=1>
    use bsl 256 //specify a BSL used to encapsulate the BIER when the packet is sent
    BIFT-id<SD_BSL>=Y //specify a BIFT-ID value required for encapsulating the
BIER header when the packet is sent, where the BIFT-ID value is configured based on a
tunnel endpoint to which the path points
    path=SID_list<SID1,SID2,R20> //specify a path when the packet is sent
  <color=2>
    use bsl 256 //specify a BSL used to encapsulate the BIER when the packet is sent
path=NULL.
```

With reference to a specific example, the following describes in detail a specific implementation process that the node in the first BIER domain determines a transmission path of the BIER multicast data packet according to the foregoing configuration table.

In some embodiments, the BFR 21 in the second BIER domain receives the user multicast join request sent by a user, and the multicast source of the user multicast join request is the BFR 11 in the first BIER domain.

Figure 4:
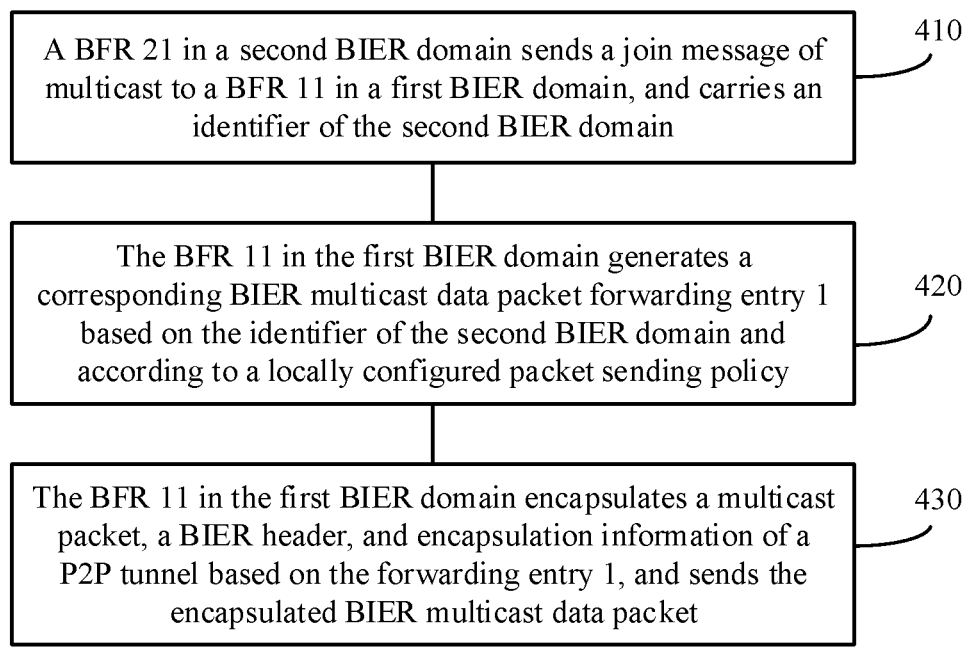
FIG. 4 is a schematic flowchart of a method of transmitting a BIER packet across BIER domains according to an embodiment of this application.

FIG. 4 is a schematic flowchart of a method of transmitting a BIER packet across BIER domains according to an embodiment of this application. The method shown in FIG. 4 may include steps 410 to 430. The following separately describes processes of steps 410 to 430 in detail.

Step 410: A BFR 21 in a second BIER domain sends a multicast join message to a BFR 11 in a first BIER domain, and the message carries an identifier of the second BIER domain (for example, a configured identifier of the second BIER domain is a color 2).

Further, the multicast join message may be a message sent by the BFR 21 in the second BIER domain to the BFR 11 in the first BIER domain by using a BGP. For example, the multicast join message may be a control-plane BGP message, for example, a BGP-MVPN message, a BGP-EVPN message, or a message sent through a tunnel by using protocol independent multicast (PIM).

Step 420: The BFR 11 in the first BIER domain generates a corresponding BIER multicast data packet forwarding entry 1 based on the identifier of the second BIER domain and according to a locally configured packet sending policy.

The BFR 11 in the first BIER domain may determine, based on the identifier color 2 of the second BIER domain and according to the locally configured packet sending policy "<color=2>path=SID_list<SID1,SID2,R20>", that a BIER multicast data packet transmitted from the BFR 11 to a PE 21 in the second BIER domain needs to pass through a BFR 20. The BIER multicast data packet forwarding entry delivered by the BFR 11 is as follows:

Forwarding entry 1: (virtual routing and forwarding (VRF), multicast source (S), multicast goal group (G), color2, SD/BSL/SI, flag=1, encappath=XXX, and encap_bit string).

If flag=1 in the forwarding entry 1, it indicates that a path configured by the BFR 11 is valid, a leaf node in the multicast goal group is not in the BIER domain, encapsulation information of a P2P tunnel needs to be determined based on the path in the forwarding entry 1, and the encapsulation information of the P2P tunnel is encapsulated before a BIER header. In addition, an egress interface of the path is searched for based on the encapsulation information of the P2P tunnel, and an IP address and a media access control (MAC) address of a next hop are determined.

For example, it should be understood that, path=SID_list<SID1,SID2,R20> may be that the BIER packet transmitted from the BFR 11 in the first BIER domain to the multicast goal needs to be forwarded through the BFR 20, and then enter the second BIER domain to be sent to the BFR 21 hop by hop. The SID1 and the SID2 may be understood as SIDs of the routers through which the tunnel between the first BIER domain and the second BIER domain passes. The BIER packet is sent by the routers whose SIDs are the SID1 and the SID2 respectively, and then arrives at the BFR 20.

Step 430: The BFR 11 in the first BIER domain encapsulates the multicast packet, the BIER header, and the encapsulation information of the P2P tunnel based on the forwarding entry 1, and sends the encapsulated BIER multicast data packet.

Different P2P tunnels may correspond to different encapsulation information. For example, the P2P tunnel is an SR-MPLS tunnel, and the encapsulation information of the P2P tunnel may be an MPLS label. For example, the P2P tunnel is a UDP tunnel, and the encapsulation information of the P2P tunnel may be a UDP header and an IP header. The following provides descriptions with reference to FIG. 5 and FIG. 6.

Figure 5:
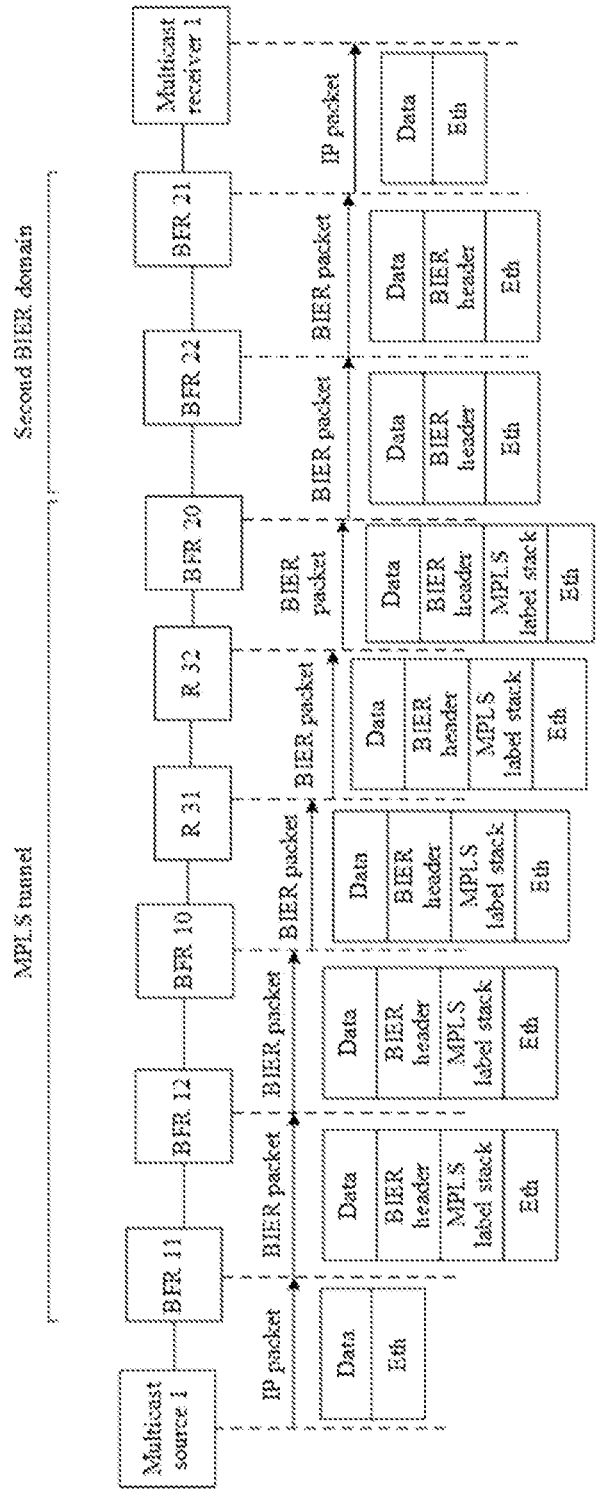
FIG. 5 is a schematic block diagram of transmitting a BIER packet across BIER domains based on an SR-MPLS tunnel according to an embodiment of this application.

FIG. 5 is a schematic block diagram of transmitting a BIER packet across BIER domains based on an SR-MPLS tunnel according to an embodiment of this application.

Step 1: A BFR 21 in a second BIER domain sends a multicast join message to a BFR 11 in a first BIER domain.

The multicast join message sent by the BFR 21 in the second BIER domain to the BFR 11 may carry an identifier of the second BIER domain and BIER information of the BFR 21. For example, the BIER information may be a BFR-ID of the second BIER domain.

Step 2: The BFR 11 in the first BIER domain determines a forwarding entry based on the identifier that is of the second BIER domain and that is carried in the multicast join message sent by the BFR 21 and according to a packet sending policy.

For example, the identifier of the second BIER domain is a color 2, and the BFR 11 determines, according to the locally configured packet sending policy "<color=2>path=SID_list<SID1,SID2,R20>", that a BIER multicast data packet transmitted from the BFR 11 to the BFR 21 in the second BIER domain needs to pass through a BFR 20.

The BIER multicast data packet forwarding entry delivered by the BFR 11 is as follows.

Forwarding entry 1: (virtual routing and forwarding (VRF), multicast source (S), multicast goal (G), color2, SD/BSL/SI, flag=1, encappath=XXX, and encap_bit string).

If flag=1 in the forwarding entry 1, it indicates that a path configured by the BFR 11 is valid, a leaf node in the multicast goal is not in the BIER domain, encapsulation information of a P2P tunnel needs to be determined based on the path in the forwarding entry 1, and the encapsulation information of the P2P tunnel is encapsulated before a BIER header. In addition, an egress interface of the path is searched for based on the encapsulation information of the P2P tunnel, and an IP address and a source MAC address of a next hop are determined.

Step 3: The BFR 11 in the first BIER domain receives an IP multicast packet sent by a multicast source 1.

Step 4: The BFR 11 encapsulates the IP multicast packet.

The BFR 11 determines, based on the delivered forwarding entry 1, that the IP multicast packet needs to be sent to the second BIER domain.

The BFR 11 may further encapsulate the IP multicast packet according to the packet sending policy and based on an ID of the BFR 21. Further, the BFR 11 may determine a BIFT-ID and a bit string in an encapsulated BIER header based on "<color=2>use bsl 256 BIFT-id<SD_BSL>=X" in local configuration information and the ID of the BFR 21. The BFR 11 may further determine the encapsulation information of the P2P tunnel based on path information "path=SID_list<SID1,SID2,R20>". For example, SIDs of routers passing through the P2P tunnel are an SID1 and an SID2 respectively. The BIER packet is sent by the routers whose SIDs are the SID1 and the SID2 respectively, and then arrives at the BFR 20 whose SID is an R 20. The encapsulation information of the P2P tunnel is encapsulated in an outer layer of the BIER header.

Step 5: The BFR 11 sends the encapsulated BIER packet to the BFR 21.

A BFR 10 may search for an egress interface of a path based on an encapsulated MPLS label stack, and determine an IP address and a source MAC address of a next hop.

Further, an SID of a next-hop router in the MPLS label stack is the SID1, and the BFR 10 determines, based on a locally stored forwarding entry that is about the router whose SID is the SID1, a forwarding egress interface that the packet carrying the SID1 identifier arrives and the MAC address of the next hop, and transmits the BIER packet to a next hop of the router whose identifier is the SID1. For example, the BFR 10 may broadcast an Address Resolution Protocol (ARP) request packet based on an IP address of the next hop of the router whose identifier is the SID1. The ARP request packet carries the IP address of the next hop, and is used to obtain a MAC address of the next hop.

Similarly, after passing through the routers whose SIDs are the SID1, the SID2, and the R 20 respectively, the BIER multicast data packet is sent to the BFR 20. The BFR 20 may send the BIER packet to the BFR 21 in the second BIER domain based on the BIER packet header.

For a specific process of sending the BIER packet in the BIER domain based on the BIER packet header, refer to the description in FIG. 2. Details are not described herein again.

Figure 6:
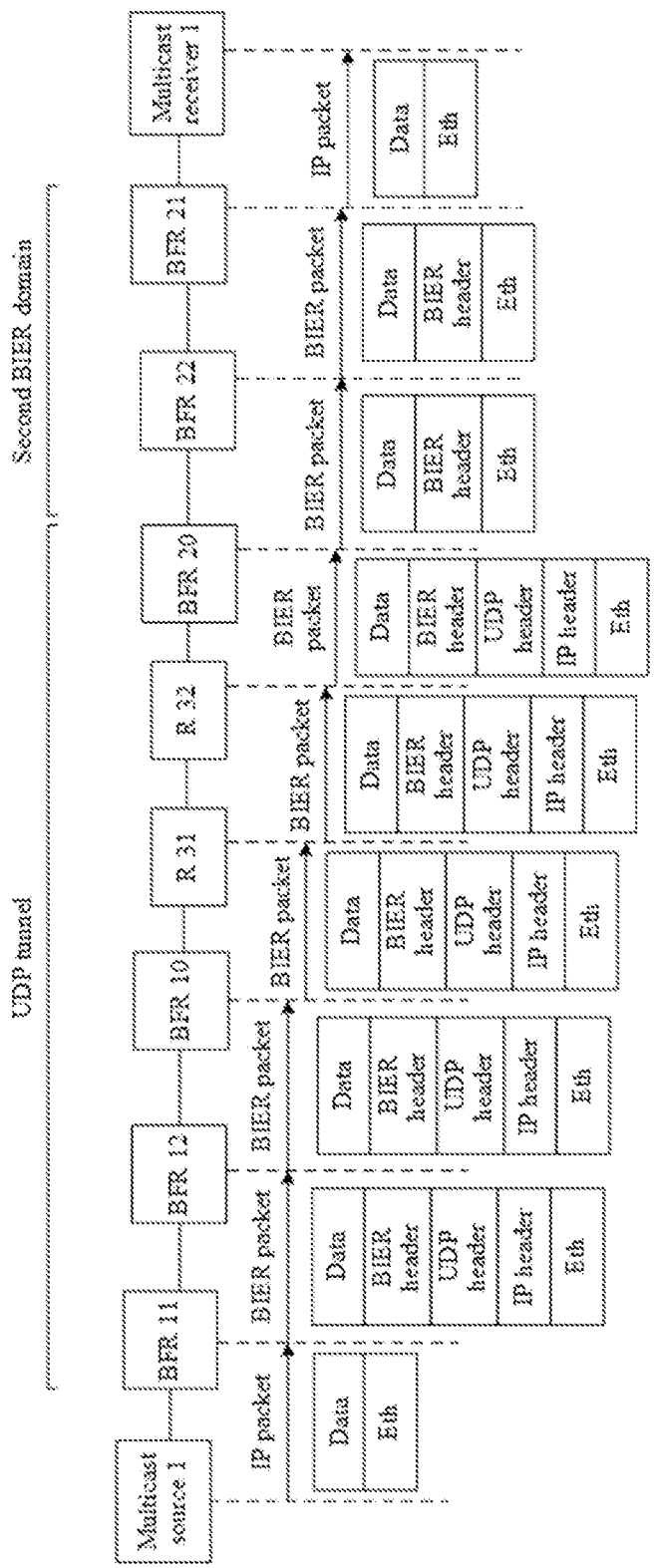
FIG. 6 is a schematic block diagram of transmitting a BIER packet across BIER domains based on a UDP tunnel according to an embodiment of this application.

FIG. 6 is a schematic block diagram of transmitting a BIER packet across BIER domains based on a UDP tunnel according to an embodiment of this application.

Step 1: A BFR 21 in a second BIER domain sends a multicast join message to a BFR 11 in a first BIER domain.

The step 1 in FIG. 6 is corresponding to the step 1 in FIG. 5. For details, refer to the description in FIG. 5. Details are not described herein again.

Step 2: The BFR 11 in the first BIER domain determines a forwarding entry based on the identifier that is of the second BIER domain and that is carried in the multicast join message sent by the BFR 21 and according to a packet sending policy.

The step 2 in FIG. 6 is corresponding to the step 2 in FIG. 5. For details, refer to the description in FIG. 5. Details are not described herein again.

Step 3: The BFR 11 in the first BIER domain receives an IP multicast packet sent by a multicast source 1.

The step 3 in FIG. 6 is corresponding to the step 3 in FIG. 5. For details, refer to the description in FIG. 5. Details are not described herein again.

Step 4: The BFR 11 encapsulates the IP multicast packet.

The BFR 11 in the first BIER domain determines an encapsulated BIER header and encapsulation information of a P2P tunnel (the P2P tunnel is a UDP tunnel, and the encapsulation information of the P2P tunnel is a UDP header and an IP header) based on path information and encapsulation information in the packet sending policy.

Further, the BFR 11 may determine a BIFT-ID and a bit string in an encapsulated BIER header based on "<color=2>use bsl 256 BIFT-id<SD_BSL>=X" in local configuration information and the ID of the BFR 21.

The BFR 11 may further encapsulate an IP header and the UDP header in an outer layer of the encapsulated BIER header as a tunnel. A corresponding port number field or protocol number field in the UDP packet indicates that the BIER header is encapsulated in the UDP packet. After the UDP header is encapsulated, the IP header is encapsulated in an outer layer of the UDP header. A destination address of the IP header is an endpoint address of a P2P tunnel specified by a path in the forwarding entry delivered by the BFR 11, so that the BIER multicast data packet is transmitted to a next hop of the P2P tunnel. After receiving the BIER multicast data packet, the next-hop node searches for an IP routing table based on the outer IP header and forwards the packet without changing content of the BIER header.

Step 5: The BFR 11 sends the encapsulated BIER packet to the BFR 21.

A BFR 10 may determine, based on the encapsulated UDP header, that the packet is a BIER multicast data packet, and may send the BIER multicast data packet to a next-hop node based on the destination address of the IP header. Similarly, after passing through routers whose SIDs are SID1, SID2, and R 20 respectively, the BIER multicast data packet is sent to a BFR 20. The BFR 20 may send the BIER packet to the BFR 21 in the second BIER domain based on the BIER packet header.

For a specific process of sending the BIER packet in the BIER domain based on the BIER packet header, refer to the description in FIG. 2. Details are not described herein again.

In some embodiments, a BFR 12 in the first BIER domain receives the user multicast join request sent by a user, and a multicast source of the user multicast join request is the BFR 11 in the first BIER domain.

Figure 7:
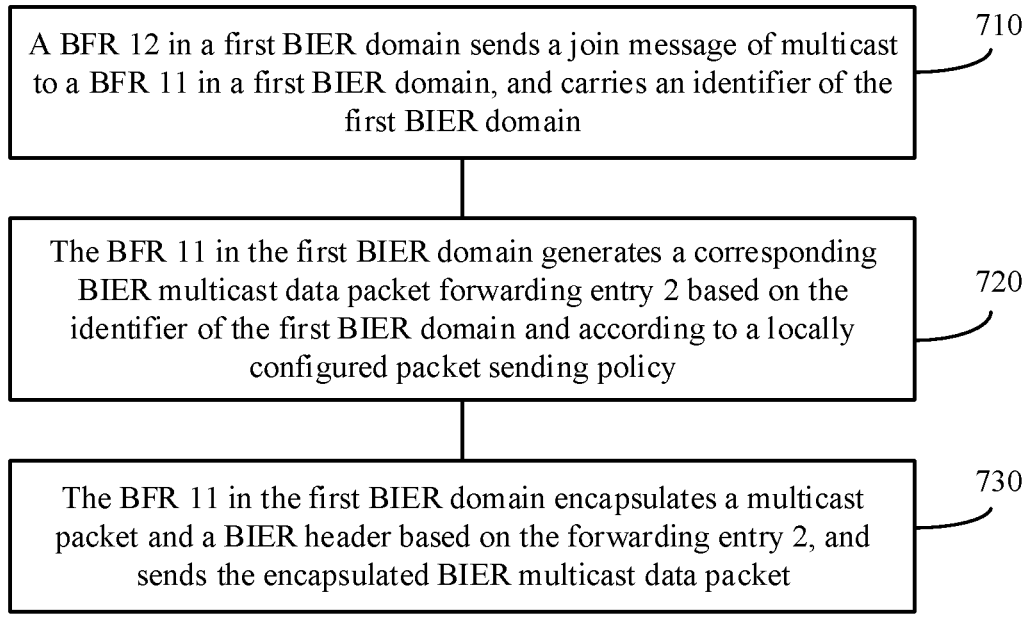
FIG. 7 is a schematic flowchart of a method of transmitting a BIER packet in a BIER domain according to an embodiment of this application.

FIG. 7 is a schematic flowchart of a method of transmitting a BIER packet in a BIER domain according to an embodiment of this application. The method shown in FIG. 7 may include steps 710 to 730. The following separately describes processes of steps 710 to 730 in detail.

Step 710: A BFR 12 in a first BIER domain sends a multicast join message to a BFR 11 in a first BIER domain, and carries an identifier of the first BIER domain (for example, a configured identifier of the first BIER domain is a color 1).

The step 710 is corresponding to the step 410. For details, refer to the description in the step 410. Details are not described herein again.

Step 720: The BFR 11 in the first BIER domain generates a corresponding BIER multicast data packet forwarding entry 2 based on the identifier of the first BIER domain and according to a locally configured packet sending policy.

The BFR 11 in the first BIER domain may determine, based on the identifier color 1 that the BFR 11 carries and according to the locally configured packet sending policy, "<color=1>path=NULL>", that a BIER multicast data packet transmitted from the BFR 11 to the BFR 12 in the first BIER domain does not need to pass through a P2P tunnel, for example, does not need to pass through a P2P tunnel from the BFR 11 to a BFR 20. The BIER multicast data packet forwarding entry delivered by the BFR 11 is as follows.

Forwarding entry 2: (VRF, S, G, color1, SD/BSL/SI, flag=0, encappath=XXX, encap_bit string).

If flag=0 in the forwarding entry 2, it indicates that a path configured by the BFR 11 is invalid, and the multicast goal is in the BIER domain, and a required egress interface and a next-hop node may be determined based on the bit string in a BIER header and a mapping relationship in a BIFT pre-stored locally.

Step 730: The BFR 11 in the first BIER domain encapsulates the multicast packet and the BIER header based on the forwarding entry 2, and sends the encapsulated BIER multicast data packet.

For a specific method of sending the BIER multicast data packet in the first BIER domain, refer to the description in FIG. 2. Details are not described herein again.

The foregoing describes in detail the BIER packet sending method provided in the embodiments of this application with reference to FIG. 1 to FIG. 7. The following describes in detail a BIER packet sending apparatus in the embodiments of this application with reference to FIG. 8 and FIG. 9. It should be understood that the descriptions of the method embodiments are corresponding to descriptions of the apparatus embodiments. Therefore, for parts that are not described in detail, refer to the foregoing method embodiments.

Figure 8:
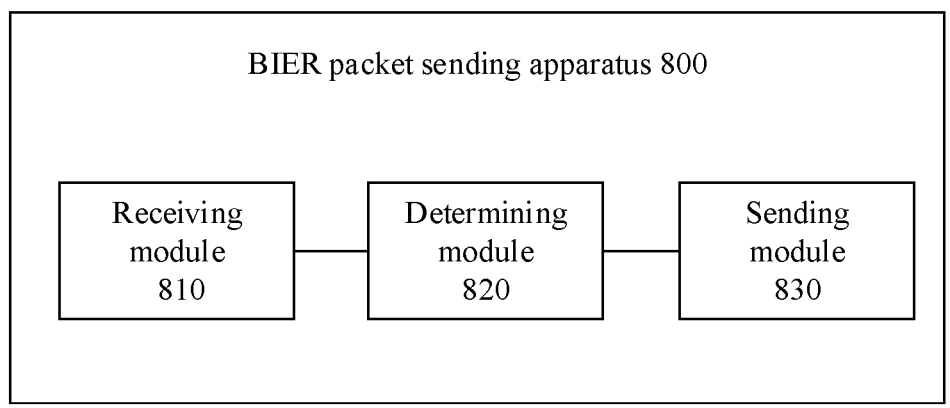
FIG. 8 is a schematic block diagram of a BIER packet sending apparatus according to an embodiment of this application.

FIG. 8 is a schematic block diagram of a BIER packet sending apparatus 800 according to an embodiment of this application. The BIER packet sending apparatus 800 may include a receiving module 810 configured to receive a packet sent by a second node in a second BIER domain, where the packet carries an identifier of the second BIER domain, and the first node is not in the second BIER domain, a determining module 820 configured to determine a BIER packet sending policy corresponding to the identifier of the second BIER domain based on the identifier of the second BIER domain and according to a preconfigured BIER packet sending policy, and a sending module 830 configured to encapsulate and send a BIER packet according to the BIER packet sending policy.

Optionally, in some embodiments, the BIER packet sending policy includes path information. The sending module 830 is further configured to encapsulate path information corresponding to the identifier of the second BIER domain into the BIER packet, and send the BIER packet to the second BIER domain based on the path information encapsulated into the BIER packet.

Optionally, in some embodiments, the BIER packet sending policy includes a BIFT-ID. The sending module 830 is further configured to encapsulate a BIER header of the BIER packet based on a BIFT-ID corresponding to the identifier of the second BIER domain, and send the BIER packet to the second node in the second BIER domain based on the BIER header.

Optionally, in some embodiments, the path information includes an SID of SR, an endpoint identifier of a UDP tunnel, an SID of an IP, or an endpoint identifier IP of a GRE tunnel.

Optionally, in some embodiments, the identifier of the second BIER domain is an SD identifier of the second BIER domain in which the second node is located.

Optionally, in some embodiments, the first node is a head node, and the second node is a leaf node.

Figure 9:
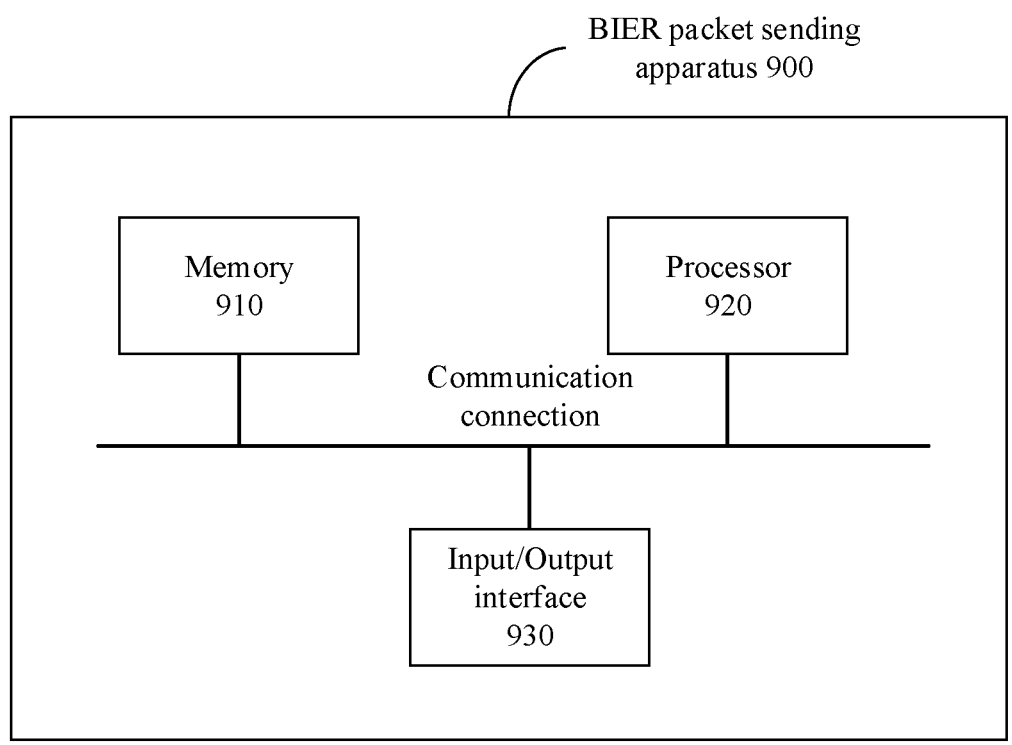
FIG. 9 is a schematic block diagram of a BIER packet sending apparatus according to an embodiment of this application.

FIG. 9 is a schematic block diagram of a BIER packet sending apparatus 900 according to an embodiment of this application. The BIER packet sending apparatus 900 may include a memory 910, a processor 920, and an input/output interface 930.

The memory 910, the processor 920, and the input/output interface 930 are connected by using an internal connection path. The memory 910 is configured to store a program instruction. The processor 920 is configured to execute the program instruction stored in the memory 910, to control the input/output interface 930 to receive input data and information, and output data such as an operation result.

It should be understood that, in the embodiments of this application, the processor 920 may be a central processing unit (CPU), or may further be another general-purpose processor, a digital signal processor (DSP), an application-specific integrated circuit (ASIC), a field-programmable gate array (FPGA), or another programmable logic device, discrete gate or transistor logic device, discrete hardware component, or the like. The general-purpose processor may be a microprocessor, or the processor may be any conventional processor or the like. Alternatively, the processor 920 may be one or more integrated circuits, and is configured to execute a related program, to implement the technical solutions provided in the embodiments of this application.

The memory 910 may include a read-only memory and a random-access memory (RAM), and provide an instruction and data to the processor 920. A part of the processor 920 may further include a non-volatile RAM. For example, the processor 920 may further store information of a device type.

In an implementation process, steps in the foregoing methods can be implemented by using a hardware integrated logical circuit in the processor 920, or by using instructions in a form of software. The method disclosed with reference to the embodiments of this application may be directly performed by a hardware processor, or may be performed by using a combination of hardware in the processor and a software module. The software module may be located in a mature storage medium in the art, such as a RAM, a flash memory, a read-only memory (ROM), a programmable ROM (PROM), an electrically erasable PROM (EEPROM), or a register. The storage medium is located in the memory 910, and the processor 920 reads information in the memory 910 and completes the steps in the foregoing methods in combination with hardware of the processor 920. To avoid repetition, details are not described herein again.

It should be understood that the BIER packet sending apparatus 900 according to this embodiment of this application is configured to perform corresponding procedures of the methods in FIG. 2 to FIG. 7 in the embodiments of this application. In addition, the foregoing and other operations and/or functions of the modules in the BIER packet sending apparatus 900 are separately configured to implement the corresponding procedures of the methods in FIG. 2 to FIG. 7 in the embodiments of this application. For brevity, details are not described herein again.

It should be noted that, in the BIER packet sending apparatus 900 shown in FIG. 9, the processor may invoke a computer program in the memory to implement the steps performed by the modules. For example, the processor may invoke a computer instruction stored in a cache to perform the steps that need to be performed by the modules (for example, the receiving module 810 and the sending module 820 shown in FIG. 8).

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

Units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a first node in a first bit index explicit replication (BIER) domain, wherein the method comprises:

receiving, from a second node in a second BIER domain, a packet carrying a first identifier of the second BIER domain;

determining, based on the first identifier and according to a locally configured BIER packet sending policy, a BIER packet sending policy corresponding to the first identifier, wherein the BIER packet sending policy comprises path information corresponding to the first identifier, and wherein the path information identifies a path from the first node to the second node;

encapsulating the path information into a BIER packet; and sending, based on the path information, the BIER packet to the second BIER domain.

2. The method of claim 1, wherein the path information comprises a segment identifier (SID) of Segment Routing (SR).

3. The method of claim 1, wherein the path information comprises an Internet Protocol (IP) of a User Datagram Protocol (UDP) tunnel.

4. The method of claim 1, wherein the path information comprises a segment identifier (SID) of a Segment Routing over Internet Protocol version 6 (SRv6).

5. The method of claim 1, wherein the path information comprises an Internet Protocol (IP) of a Generic Routing Encapsulation (GRE) tunnel.

6. The method of claim 1, wherein the BIER packet sending policy further comprises a second identifier of a bit index forwarding table (BIFT-ID) corresponding to the first identifier, and wherein encapsulating the BIER packet further comprises encapsulating a BIER header of the BIER packet based on the BIFT ID.

7. The method of claim 1, wherein the first node is a head node, and wherein the second node is a leaf node.

8. A first node in a first bit index explicit replication (BIER) domain, wherein the first node comprises:

a memory configured to store programming instructions; and a processor coupled to the memory, wherein the programming instructions cause the processor to be configured to:

receive, from a second node in a second BIER domain, a packet carrying a first identifier of the second BIER domain;

determine, based on the first identifier and according to a locally configured BIER packet sending policy, a BIER packet sending policy corresponding to the first identifier, wherein the BIER packet sending policy comprises path information corresponding to the first identifier, and wherein the path information identifies a path from the first node to the second node;

encapsulate the path information into a BIER packet; and send, based on the path information, the BIER packet to the second BIER domain.

9. The first node of claim 8, wherein the path information comprises a segment identifier (SID) of Segment Routing (SR).

10. The first node of claim 8, wherein the path information comprises an Internet Protocol (IP) of a User Datagram Protocol (UDP) tunnel.

11. The first node of claim 8, wherein the path information comprises a segment identifier (SID) of a Segment Routing over Internet Protocol version 6 (SRv6).

12. The first node of claim 8, wherein the path information comprises an Internet Protocol (IP) of a Generic Routing Encapsulation (GRE) tunnel.

13. The first node of claim 8, wherein the BIER packet sending policy further comprises a second identifier of a bit index forwarding table (BIFT-ID) corresponding to the first identifier, and wherein the programming instructions further cause the processor to be configured to encapsulate a BIER header of the BIER packet based on the second identifier.

14. The first node of claim 8, wherein the first node is a head node, and wherein the second node is a leaf node.

15. A computer program product comprising computer-executable instructions stored on a non-transitory computer-readable storage medium that, when executed by a processor of a first node in a first bit index explicit replication (BIER) domain, cause the first node to:

receive, from a second node in a second BIER domain, a packet carrying a first identifier of the second BIER domain;

determine, based on the first identifier and according to a locally configured BIER packet sending policy, a BIER packet sending policy corresponding to the first identifier, wherein the BIER packet sending policy comprises path information corresponding to the first identifier, and wherein the path information identifies a path from the first node to the second node;

encapsulate the path information into a BIER packet; and send, based on the path information, the BIER packet to the second BIER domain.

16. The computer program product of claim 15, wherein the BIER packet sending policy further comprises a second identifier of a bit index forwarding table (BIFT-ID) corresponding to the first identifier, and wherein the computer-executable instructions further cause the first node to encapsulate a BIER header of the BIER packet based on the BIFT-ID.

17. The computer program product of claim 15, wherein the first node is a head node, and wherein the second node is a leaf node.

18. The computer program product of claim 15, wherein the second BIER domain comprises a plurality of sub-domains, and wherein the first identifier is associated with each of the sub-domains.

19. The method of claim 1, wherein the second BIER domain comprises a plurality of sub-domains, and wherein the first identifier is associated with each of the sub-domains.

20. The first node of claim 8, wherein the second BIER domain comprises a plurality of sub-domains, and wherein the first identifier is associated with each of the sub-domains.

* * * * *